United States Patent [19]
Sorkin

[11] Patent Number: 6,098,290
[45] Date of Patent: *Aug. 8, 2000

[54] DEVICE AND METHOD FOR STRIPPING A CABLE

[76] Inventor: Felix L. Sorkin, 4115 Greenbriar Dr., P.O. Box 1503, Stafford, Tex. 77477

[ * ] Notice: This patent is subject to a terminal disclaimer.

[21] Appl. No.: 09/281,647

[22] Filed: Mar. 30, 1999

Related U.S. Application Data

[63] Continuation-in-part of application No. 09/144,171, Aug. 31, 1998.

[51] Int. Cl.[7] .................................................. H02G 1/12
[52] U.S. Cl. .............................................. 30/91.2; 30/90.1
[58] Field of Search ..................... 30/90.1, 90.6, 30/90.2; 83/947; 29/564.4, 33 F; 81/9.4

[56] References Cited

U.S. PATENT DOCUMENTS 4,689,882  9/1987  Lorenz .................................... 30/90.1
5,632,088  5/1997  Naso et al. ......................... 30/90.1 X

*Primary Examiner*—Douglas D. Watts
*Attorney, Agent, or Firm*—Harrison & Egbert

[57] ABSTRACT

A device for stripping a cable having a body with a channel extending therethrough so as to open at a narrow end of the body and a knife affixed to the body so as to have a blade with a cutting edge extending upwardly into the channel. The blade extends at an angle of between 70 degrees and 89 degrees with respect to the longitudinal axis. The body includes a handle and a cutting head affixed to an end of the handle. The channel extends through the handle and the cutting head. The knife is affixed to the cutting head. The handle is compressible so as to reduce the diameter of the channel upon the application of a squeezing force onto the handle. The handle has projections extending into the channel. The cutting head has a notch extending along an outer surface of the cutting head. The knife is received within the notch. The knife is formed of a stamped metal material.

29 Claims, 5 Drawing Sheets

DEVICE AND METHOD FOR STRIPPING A CABLE

RELATED APPLICATIONS

The present application is a continuation-in-part of U.S. application Ser. No. 09/144,171 filed on Aug. 31, 1998, and entitled "DEVICE AND METHOD FOR STRIPPING A CABLE", presently pending.

TECHNICAL FIELD

The present invention relates to cable strippers for use with cable anchors for use in post-tension concrete structures. More particularly, the present invention relates to devices for stripping cable sheath from end portions of cables which are to be secured by the cable anchors. The present invention also relates to a method of stripping a sheath from an end portion of a cable.

BACKGROUND ART

The prior art is replete with concrete construction cable tensioning systems. These systems include both pre-stressed and post-tensioned cables and wire rope. Engineering in the post-tensioning of concrete is a well developed technology and the utilization of such tendons extending through a concrete slab or beam is conventional. The tendons provide structural strength for the concrete in a manner and at a cost not heretofore possible with conventional rebar construction. Utilization of such tendons does, however, require anchor assemblies on opposite ends thereof and the termination of the cable itself at the anchors. The anchor assembly secures the ends of the terminated tendons extending through the concrete bed whereby the tendons remain taut and effective during the life-span of the construction. The effectiveness requires the protection of the terminated tendons, which are usually made of steel or the like, from corrosion. Corrosion forces are well known to cause deterioration in the strength of the concrete if allowed to jeopardize the integrity of tensioning members. To prevent corrosion of the tendon, the steel fibers are usually sheathed in a plastic membrane throughout the length of the slab. The membranes do, however, require termination at the point where the tendons are secured within the anchor assemblies. The reason is obviously to provide appropriate structural integrity at the secured portion.

In the process of post-tensioning, it is important that the tendon is free to move within the hardened concrete so that the tensile load on the tendon is evenly distributed along the entire length of the structure. Methods used to ensure that the tendons provide free movement within the hardened concrete include laying a number of strands of wire in a sheath. It is within this sheath that the strands of wire are stressed after the concrete is hardened. After stressing, the wires exposed from the ends of the anchor assemblies are then cut-off or terminated.

During such post-tensioning of a concrete structure, it is known to insert an end of a cable, usually referred to as a "tendon", into a tapered passage extending through a cable anchor, and then to secure the cable to the cable anchor by means of wedges inserted into the tapered passage into engagement with the cable. However, before the insertion of the wedges, it is necessary to strip the sheath from the end portion of the cable. So as to preserve the "encapsulated" condition of such anchor assemblies and such cable, it is desirable to terminate the sheathing of the cable at a point just rearward of the end of the wedges within the tapered bore of the anchor. As such, a more effective enclosing of the steel strands of wire within the cable is achieved.

U.S. Pat. No. 5,632,088, issued on May 27, 1997, to Naso et al., for a cable stripper device. The purpose of this cable stripper device is to allow for the stripping of the sheathing from the cable at a location just rearward of the end of the wedges within the tapered passage of the anchor. This cable stripper device has an elongate cutter on a tubular body. The cable stripper has a cutter at one end thereof with an inwardly projecting transverse cutter blade. The cutter and the tubular body are connected so as to allow the cutter to move relative to the tubular body. The tubular body is insertable into the tapered passage of the cable anchor. The tubular body has a frusto-conical surface so as to wedge the cutter blade into penetrating engagement with a sheath on the cable. The cutter blade is hingedly connected to the tubular body so as to be capable of moving inwardly and outwardly relative to the relative position of the end of the tubular body within the tapered passage of the anchor. The cutter blade is positioned at an end of this angular arm.

U.S. Pat. No. 5,745,996, issued on May 5, 1998, to Kenny et al., teaches a device for cutting sheathing from a tendon extending through an anchor assembly. This device includes a housing adapted to be rotatable about the sheathed tendon and a blade having a cutting edge. The blade cutting edge is oriented in a selected cutting position within the anchor assembly when the housing is mounted on the sheathed tendon and rotated thereabout. In particular, this device includes a means for securing the blade to the housing or placing the blade in a position in contact with the anchor assembly inner wall so as to deflect the cutting edge toward the sheathed tendon into contact with the sheathing when the device is mounted on the sheathed tendon.

Unfortunately, with these devices, in order to achieve the proper "cutting" effect, it is necessary to first insert the tool into the tapered passage of the anchor. When the tool has been inserted as far as possible into the tapered passage, it is necessary to hammer the opposite end of the tubular body so as to cause the cutter blade to "plow" through the plastic of the sheathing of the cable. When the exterior of the tapered portion of the tubular body is in surface-to-surface contact with the inner wall of the tapered passage of the anchor, the tool can then be rotated so that the cutter blade creates a cut through the sheathing which is transverse to the longitudinal axis of the cable.

Unfortunately, because of the strong forces that are required, the cutter blade must be formed of a hardened steel material. The arm having the cutter blade attached thereto must be machined and strongly affixed to the tubular body. The effort required to hammer the tubular body and to "plow" through the plastic can be extreme at times. As a result, workers will tend to take a more expedient approach and simply rotate the tool at an improper location before the desired position within the tapered passage of the anchor. As a result, the sheathing may remain in those areas which are to be exposed to the wedges. The effect of "plowing" through the plastic material of the sheathing in a longitudinal direction along the cable quickly causes the sharpness of the cutter blade to deteriorate. Furthermore, the tubular body of the tool requires that the entire tool be threaded over the exterior of the cable. Since the cable, in intermediate anchorages, can extend for a relatively long distance, a great deal of labor is required to properly "thread" the cable through the interior of the tubular body.

U.S. patent application Ser. No. 09/144,171, from which the present application continues, describes a device for stripping a cable having a body of a generally constant diameter portion. The body tapers so as to narrow in diameter toward the narrow end. The generally constant diameter portion of the body includes a knurled exterior surface. The channel opens at the end of the body opposite to the narrow end. The knife is affixed to the bottom of the channel at the narrow end. The knife is affixed within the channel inwardly of the narrow end. The knife has a cutting edge which is formed at an acute angle with respect to the longitudinal axis of the channel. This acute angle is between 70 and 89 degrees. The knife is rigidly affixed by the use of an insert element adjacent to the narrow end of the body.

Although this invention works properly for the stripping of the sheathing from the cable, the forming of the handle of a solid steel material has some difficulties. The rigid material used for the formation of the handle will prevent the worker from properly gripping the sheathing so as to remove the sheathing from the cable. Thus, after the sheathing is properly cut from the cable within the anchor assembly, another procedure must be used so as to effectively slide the sheathing along and off the cable. As such, a need developed to be able to properly "grip" the sheathing during the cutting operation. Another difficulty with this invention was an inefficiency associated with the insert element. A separate tool was required so as to remove the insert element so as to replace the knife. Since knife replacement can occur relatively frequently, it was found that a need developed to be able to remove the knife in a more efficient manner without the assistance of an auxiliary tool.

It is an object of the present invention to provide a method and apparatus for the stripping of sheathing from a cable which grips the cable in an easier and more effective manner.

It is another object of the present invention to provide a method and device which allows the tool to be attached at any location adjacent to an intermediate anchor of a post-tension system.

It is another object of the present invention to provide such a device which does not require "threading" over the length of the cable.

It is a further object of the present invention to provide such a device which facilitates the insertion of the tool into the wedge cavity of the anchor.

It is still another object of the present invention to provide a cable stripper device which avoids the "plowing" through the material of the sheathing of the cable.

It is still another object of the present invention to provide a tool which minimizes the machining required for the formation of the cutter blade.

It is still a farther object of the present invention to provide a cable stripper device which allows for a simultaneous "gripping" of the sheathing during the cutting operation so as to facilitate the removal of the sheathing from the cable.

It is still a further object of the present invention to provide a tool which utilizes a stamped cutter blade which can be quickly and easily replaced without the assistance of additional tools.

It is still a further object of the present invention to provide a cable stripper which is easy to use, relatively inexpensive and easy to manufacture.

These and other objects and advantages of the present invention will become apparent from a reading of the attached specification and appended claims.

SUMMARY OF THE INVENTION

The present invention is a device for stripping a cable comprising a body having a channel extending therethrough so as to open at a narrow end of the body and a knife affixed to the body so as to have a blade with a cutting edge extending upwardly into the channel. The blade extends at an angle of between 70 and 89 degrees with respect to the longitudinal axis of the channel.

The body includes a handle and a cutting head affixed to an end of the handle. The channel extends through the handle and the cutting head. The knife is affixed to the cutting head. The handle is compressible so as to reduce a diameter of the channel. The handle has projections extending into the channel. These projections are in the form of ribs extending parallel to the longitudinal axis of the channel. The cutting head is removably affixed to the handle. The handle is formed of a flexible polymeric material.

The cutting head has a notch extending along an outer surface of the cutting head. The knife is received within this notch. The cutting head has a cutout area at the narrow end. The blade extends upwardly into the channel and through the cutout area. A locking member is rotatably mounted onto the cutting head. The locking member is movable between a first position locking the knife within the notch and a second position suitable for releasing the knife from the notch. The knife has a hole formed adjacent an end opposite the blade. The notch has a pin formed therein. The hole of the knife is received by the pin. The locking member abuts a surface of the knife when in the first position. The knife is formed of a stamped metal material. The blade has a bottom surface. The cutting edge is inclined approximately 15 degrees with respect to this bottom surface.

The present invention is also a method of stripping a sheathing from a cable in an anchor of a post-tension system including the steps of: (1) forming a tool having a channel extending therethrough with a knife affixed at one end of the channel; (2) inserting the tool into the tapered bore of the anchor until the knife engages the sheathing of the cable; (3) rotating the tool around the cable such that the knife draws the tool further into the tapered bore; (4) squeezing the tool so as to compressively contact the sheathing exterior of the tapered bore; and (5) pulling the tool from the tapered bore so as to remove a cut section of the sheathing from the tapered bore. The tool is formed so as to have a handle of a flexible polymeric material. This handle has projections extending into the channel.

DETAILED DESCRIPTION OF THE PRESENT INVENTION

Figure 1:
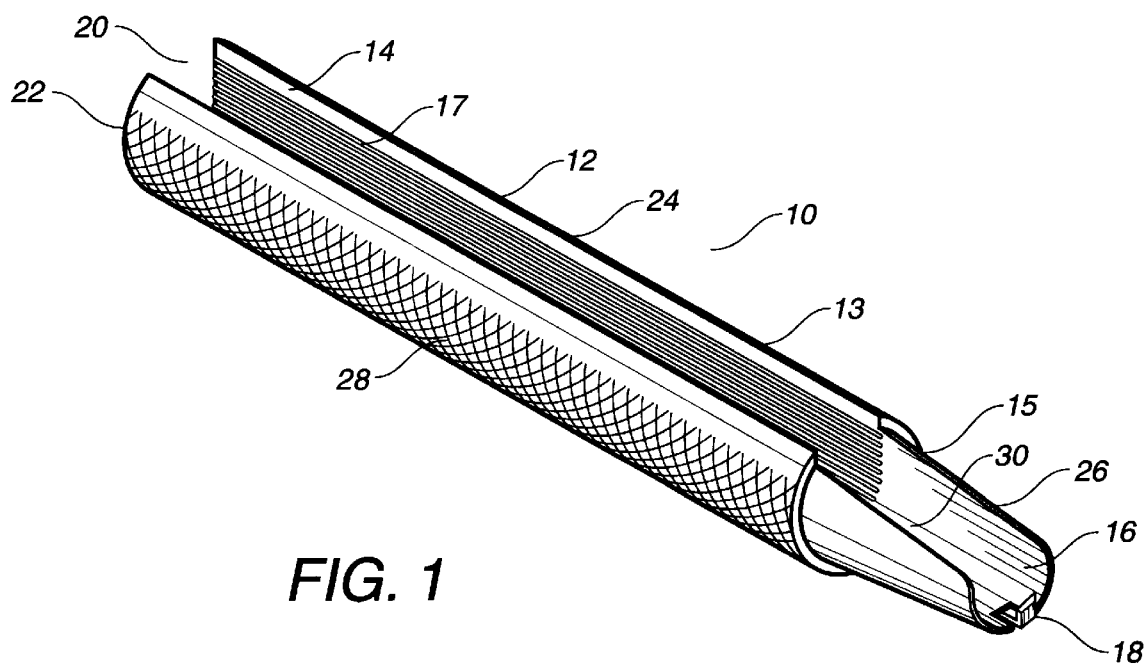
FIG. 1 is a perspective view of the device in accordance with the preferred embodiment of the present invention.

Referring to FIG. 1, there is shown at 10 the tool in accordance with the teachings of the present invention for the stripping of sheathing from a cable of a post-tension anchor system. The tool 10 has a body 12 having a channel 14 extending therethrough. The body has a narrow end 16 at one end thereof. A knife 18 is affixed at the narrow end 16 of the body 12. Knife 18 has a cutting edge extending at an acute angle relative to the longitudinal axis of the channel 14.

In the present invention, the body 12 includes a handle 13 and a cutting head 15. The cutting head 15 is removably affixed to an end of the handle 13. The handle 13 is formed of a flexible polymeric material. The handle 13 is desirably compressible so as to reduce the size of the channel 14 upon an application of a squeezing force onto the exterior surface of the handle 13. The channel 14 extends through the interior of the handle 13 so as to have one end opening at the narrow end 16 of the cutting head 15 and an opposite end 20 opening at the end 22 of the handle 13. The channel 14 should have a sufficient width and depth so as to accommodate the size of the cable which is to be stripped. In particular, the width of the channel 14 should be sufficient so that the cable, along with its sheathing, can be easily placed within the channel 14. As can be seen in FIG. 1, projections 17 extend from the handle 13 into the channel 14. Projections 17 are, desirably, ribs which extend longitudinally along the channel 14. These projections 17 extend inwardly into the channel 14 so as to allow the user to properly squeeze the handle 13 so as to apply a compressive force onto a cable received within the channel 14. The projections 17 will grasp or engage the sheathing so as to facilitate the ability of the user of the tool 10 to remove the sheathing from the underlying tendon.

The body 12 has a constant diameter portion 24 and a tapered portion 26. The constant diameter portion 24 has a knurled surface 28 formed thereon. The knurled surface 28 facilitates the ability to properly rotate the tool 10 around the exterior of a cable within the channel 14. The tapered portion 26 narrows in diameter from the constant diameter portion 24 to the narrow end 16. The tapered portion 26 should have a size which is less than the size of the tapered passage within the anchor into which it is to be inserted. Generally, the angle of taper of the tapered section 26 will match the angle of taper of the tapered bore within the anchor. In actual use, the cable can simply be inserted into the channel 14 by placing the tool 10 over the cable. As such, the present invention avoids the problems associated with "threading" the cable through a tubular interior of the tool 10. The tool 10 is suitable for use in association with any sort of anchorages, including intermediate anchorages.

As can be seen in FIG. 1, the knife 18 extends across a portion of the bottom 30 of channel 14. The knife 18 is located at the narrow end 16 of the cutting head 15. As will be described hereinafter, the blade of the knife 18 is configured so as to facilitate the ability to insert the tool into the tapered bore of the anchor and to facilitate the ability to properly cut the cable. The knife 18 may be formed of a stamped steel material. Within the concept of the present invention, it is not necessary to machine the cutting edge of the blade of knife 18 since it is not necessary for the cutting edge of knife 18 to "plow" through the plastic sheathing of a cable.

Figure 2:
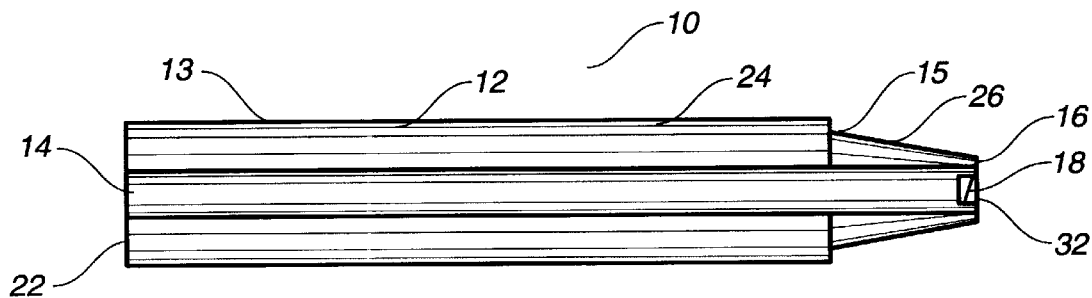
FIG. 2 is a plan view of the device in accordance with the preferred embodiment of the present invention.

FIG. 2 shows a plan view of the tool 10. As can be seen, the channel 14 extends longitudinally through the body 12. The channel 14 has one end opening at end 22 of the handle 13. The channel 14 has an opposite end opening at the narrow end of the cutting head 15. The channel 14 has a generally constant width extending along its length. The body 12 has a constant diameter portion 24 and a tapered portion 26. The tapered portion 26 extends from the constant diameter portion 24 to the narrow end 16. A cutout area 32 is positioned at the narrow end 16 of the body 12. Cutout area 32 has knife 18 extending therethrough. Cutout area 32 allows the blade of the knife 18 to be extended into the channel 14. When the knife 18 is affixed onto the cutting head 15 of the body 12 it is in a rigid and fixed non-movable condition.

As can be seen in FIG. 2, the knife 18 is positioned so as to extend through the cutout area 32 on the narrow end 18 of the cutting head 15. The blade of knife 18 is illustrated as forming an acute angle with respect to the longitudinal axis of the channel 14. Ideally, within the concept of the present invention, this acute angle should be between 70 and 89 degrees with respect to this longitudinal axis. Alternatively stated, this acute angle should be between 1 and 20 degrees with respect to a transverse of this longitudinal axis. This arrangement is described hereinafter in greater detail.

Figure 3:
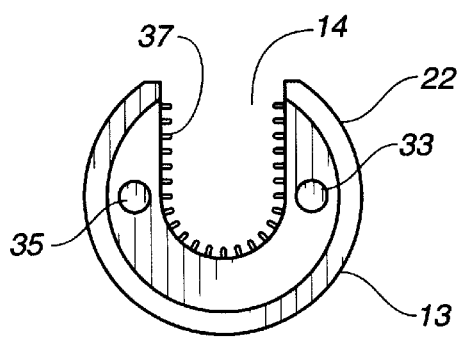
FIG. 3 is an isolated end view of the handle used in the present invention.

FIG. 3 shows the end 22 of the handle 13. As can be seen, the handle 13 has a generally circular configuration with the channel 14 extending thereinto. Receiving holes 33 and 35 are formed interior of the handle 13 so as to facilitate the attachment of the cutting head 15 onto the handle 13. In FIG. 3, it can be seen that the handle 13 has projections 37 extending thereinto. These projections 37 are, preferably, in the form of ribs extending longitudinally along the channel 14. However, and alternatively, these projections 37 can be in the nature of pins, a knurled surface, dimples, or ribs which extend transverse to the longitudinal axis of channel 14. These projections 37 facilitate the ability to squeeze the handle 13 and engage the sheathing of the tendon extending therethrough. As such, this configuration of the handle 13 facilitates the ability to remove the sheathing from the underlying tendon.

Figure 4:
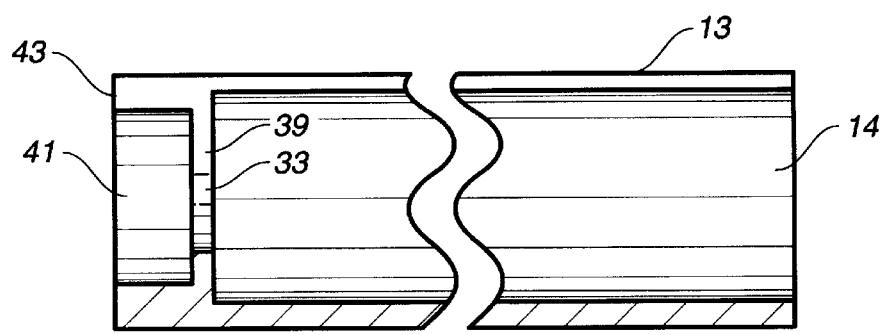
FIG. 4 is a cross-sectional view of the handle as used in the present invention.
Figure 5:
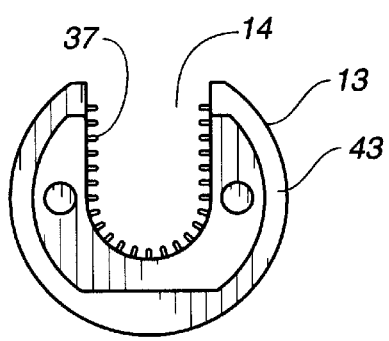
FIG. 5 is an opposite end view of the handle as used in the present invention.

FIG. 4 shows a cross-sectional view of the handle 13. It can be seen that the channel 14 extends through the interior of the handle 13. The structure of the handle 13 is assured by the formation of the interior surface 39. The cutting head can be received within the opening 41 located at end 43 of the handle 13. Suitable fastener members can be received through the hole 33 formed in the section 39 of handle 13.

FIG. 4 shows the opposite end 43 of the handle 13. Projections 37 are illustrated as extending along the inner surface of the handle 13 within the channel 14.

Figure 6:
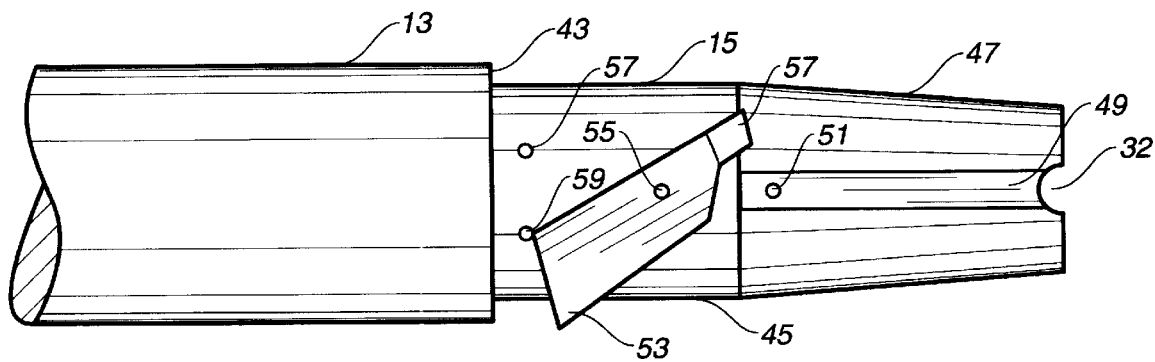
FIG. 6 is a bottom view of the cutting head as used in the present invention.

FIG. 6 is a detailed view showing the attachment of the cutting head 15 to the handle 13. The cutting head 15 can be formed of a rigid steel material and is suitably fastened by bolts, pins, rivets or other means within the end 43 of the handle 13. The cutting head 15 includes a connector section 45 and a tapered section 47. A notch 49 is formed in the tapered section 47 and extends to the cutout area 32. Notch 49 has a pin 51 formed therein at an end of the notch 49 opposite the cutout area 32. The pin 51 is designed so as to receive a hole formed in a blade fastened within the notch 49. A locking member 53 is rotatably mounted at point 55 onto the straight section 45 of the cutting head 15. The locking member 53 is rotatable between a first position (illustrated in FIG. 6) which allows for a removal of the knife from the notch 49 to a closed position in which the outwardly extending surface 57 of the locking member 53 will overlie the end of the knife 18 received within the notch 49 so as to fixedly "lock" the knife in its position within the notch 49. The locking member 53 can be mounted on point 55 so as to be rotatable therearound. Locking positioners 57 and 59 are provided on the straight section 45 of cutting head 15 so as to retain the locking member 53 in its locking position over the pin 51 and over the knife received within slot 49.

Figure 7:
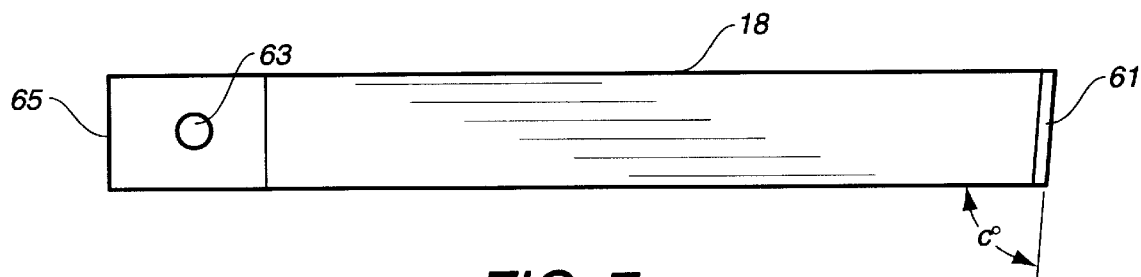
FIG. 7 is a plan view of the knife as used in the present invention.

FIG. 7 is an isolated view of the knife 18. As can be seen, the knife 18 has a blade 61 at one end thereof. A hole 63 is formed adjacent to the opposite end 65 of the knife 18. The knife 18 will have a size suitable for receipt within the notch 49. The blade 61 will extend upwardly through the cutout area 32 when the knife 18 is received within the notch 49. The hole 63 will be of a sufficient diameter to fit onto the pin 51. When the knife 18 is received within the notch 49, the locking member 53 can be suitably rotated so that the surface 57 overlies the end 65 of the knife 18 and overlies the pin 51 and the portion of the knife 18 received thereon.

In FIG. 7, it can be seen that the blade 16 extends at an angle "c" with respect to the longitudinal axis of the knife 18 and/or the longitudinal axis of the channel 14. Angle "c" is between 70 and 89 degrees. In the preferred embodiment of the present invention, this angle "c" will be between 85 and 87 degrees. If the blade 61 were transverse to the longitudinal axis of the knife 18, then it would not create the desired cutting pattern for drawing the knife inwardly into the bore of the anchor nor would it effectively cut the tendon. As such, the broadest term to express the angle "c" would be that the blade 16 is arranged in non-transverse relationship to the longitudinal axis of the channel 14.

Figure 8:
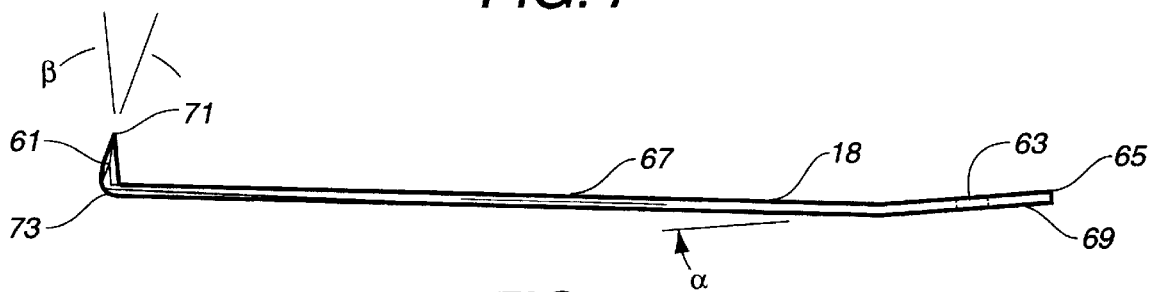
FIG. 8 is a side view of the knife as used in the present invention.

FIG. 8 shows a side view of the knife 18. As can be seen, hole 63 is positioned adjacent to the end 65 of knife 18. The knife 18 includes a portion 67 which extends upwardly from the end section 69 by an angle α. This angle α is, in the preferred embodiment of the present invention, between 6 and 7 degrees. This angle α will follow the angle of taper associated with the tapered section 47 of the cutting head 15. The blade 61 has a cutting edge 71 at an end opposite to a bottom surface 73 of the blade 16. The blade 61 extends upwardly from the section 67 of knife 18. The blade 61 will extend inwardly at an angle β with respect to the vertical. Angle β is, in the preferred embodiment of the present invention, twenty-five degrees (25°). This angle β assures that the cutting edge 71 of blade 61 will engage the sheathing of the tendon and will serve to draw the knife 18 along the sheathing.

Figure 9:
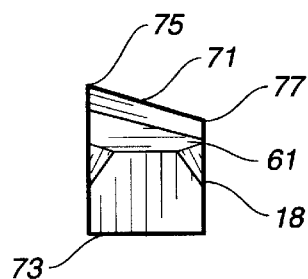
FIG. 9 is an end view of the knife as used in the present invention.

FIG. 9 shows an end view of the knife 18 and showing, in particular, the blade 61. It can be seen that the cutting edge 71 extends at an angle with respect to the bottom surface 73. The angle of the cutting edge 71 is approximately fifteen degrees (15°) extending from an initial engagement point 75 to the lower edge 77. The engagement point 75 is a sharp point which will help to penetrate the sheathing when the tool 10 is initially inserted into the cavity of the anchor.

Figure 10:
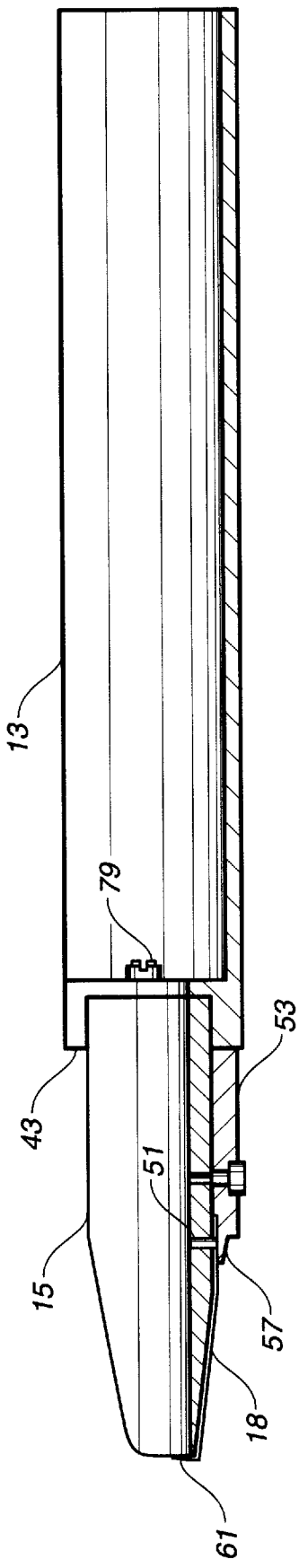
FIG. 10 is a cross-sectional view showing the assembly of the present invention.

FIG. 10 is a cross-sectional view showing the manner in which the cutting head is joined to the handle 13. As can be seen, a screw or bolt 79 serves to secure the rearward portion of the cutting head 15 onto the end 43 of the handle 13. In FIG. 10, it can be seen that the cutting head 15 has locking member 53 mounted onto pivot point 55. The locking member 53, as shown in its locking position, is particularly illustrated in FIG. 10. As can be seen, the surface 57 of the locking member 53 overlies the end of the knife 18 located within its channel. Also, the hole 63 of knife 18 is positioned over pin 51. As a result, the knife 18 is fixedly retained within the notch 49 so that the blade 61 will extend upwardly into the cutout area 32 at the end of the cutting head 15. This arrangement facilitates the ability to form the knife 18 of a simple stamped steel material. The positioning of the knife 18 within the notch 49 assures longitudinal rigidity of the knife 18. Although the individual knives 18 are of a very "flimsy" material, the arrangement of such a knife 18 in its notch 47 turns such flimsy material into a rigid cutting tool. This rigidity assures that the blade 18 will have sufficient strength and non-deflectability so as to cut the tough sheathing associated with the cable.

At the time that the worker should decide that the knife 18 and its associated blade 61 have become too dull to further carry out simple cutting activities, the knife 18 can be removed by simply rotating the locking member 53 so that the locking member 53 is in its releasing position (shown in FIG. 6). The knife 18 can be simply lifted from the notch 49 and replaced with another knife 18. The locking member 53 can be then rotated to the position shown in FIG. 10 so that the worker can easily resume his cutting activities. As such, the knife 18 can be easily replaced without the need for auxiliary tools.

Figure 11:
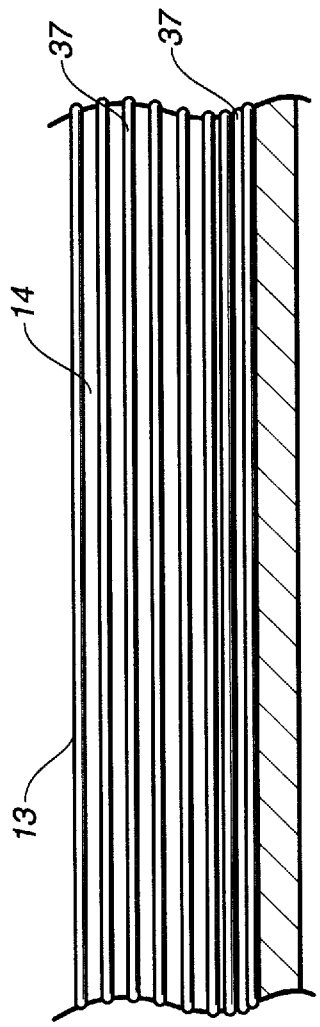
FIG. 11 is a cross-sectional view showing the projections formed within the channel associated with the handle of the present invention.

FIG. 11 shows the interior of the channel 14 formed in the handle 13. As can be seen, projections 37 extend longitudinally along the channel 14. These projections 37 are illustrated, in the preferred embodiment of the present invention, as small ribs extending along the length of the handle 13. Since the handle 13 is formed of a flexible polymeric material, the worker can exert sufficient squeezing force onto the exterior of the handle 13 so that the projections 37 engage the sheathing of the cable. As such, after the sheathing has been effectively cut within the anchor, the worker can squeeze the handle 13 so as to grasp the sheathing and to pull the sheathing from the underlying tendon. This arrangement will avoid any undue forces upon the blade 61 and will facilitate the removal of the sheathing from the underlying tendon.

Figure 12:
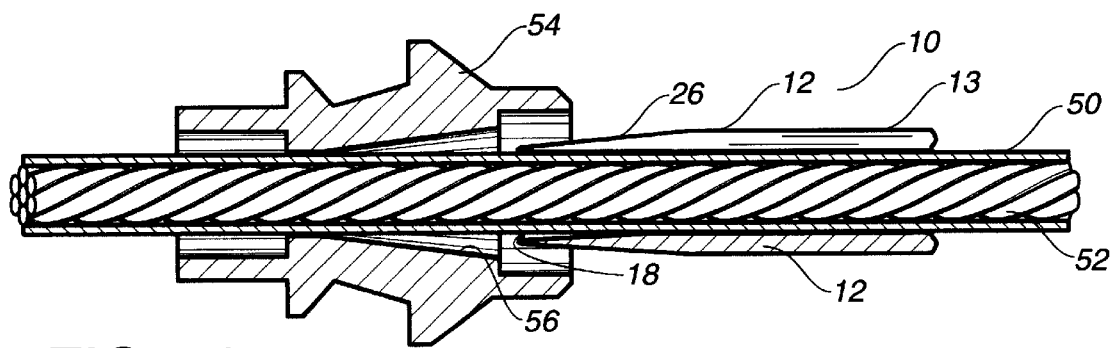
FIG. 12 illustrates the method of the present invention in which the tool is inserted into the tapered passage of an anchor.

FIGS. 12–15 show the manner in which the tool 10 can be used for the stripping of sheathing 50 from a cable 52. As illustrated in FIG. 12, the cable 52 has its sheathing 50 extending therearound. The cable 52 extends through the interior of an anchor 54. The anchor 54 has a tapered bore 56 suitable for the receipt of wedges therein. The anchor 54 which is illustrated is of a conventional configuration.

As can be seen in FIG. 12, the tool 10 has body 12 extending around the exterior of the cable 52. The tool 10 is positioned generally outwardly of the tapered bore 56 relative to anchor 54. The blade of knife 18 is positioned in close proximity to the sheathing 50 of the cable 52.

Figure 13:
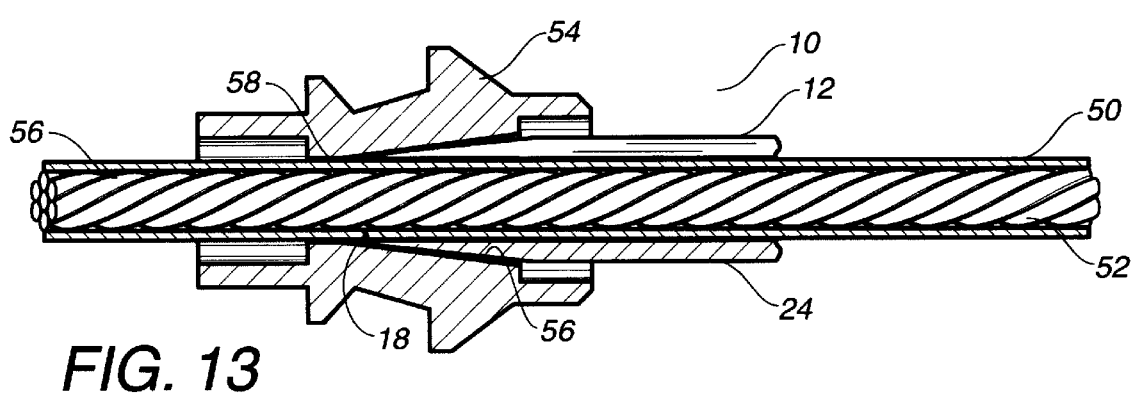
FIG. 13 is an illustration of the method of the present invention in which the tool is rotated so as to be in its terminal position within the interior of the anchor.

So as to initiate the proper cutting of the sheathing 50 from the cable 52, it is necessary to insert the tool 10 into the tapered bore 56 of anchor 54. This arrangement is illustrated in FIG. 13. Initially, the tool 10 is inserted so that the tapered portion 26 of body 12 resides within the tapered bore 56. The constant diameter portion 24 of the tool 10 should be gripped by hand and pushed into the tapered bore 56 as far as possible. At such a point, the cutting edge of the blade of knife 18 will engage the sheathing 50 of cable 52.

The workman can then rotate the tool 10 in a suitable direction so that the cutting edge of the blade of knife 18 will cut further into the sheathing. The tool 10 should continue to be rotated such that the angled relationship between the blade of knife 18 and the longitudinal axis of the body 12 of tool 10 causes the tool 10 to be drawn further into the tapered bore 56. It is only with this angling of the blade of the knife that the "drawing inward" effect is achieved. The tool 10 should continue to be rotated until the exterior of the tapered portion 26 of tool 10 strongly abuts the walls of the tapered bore 56 of anchor 54. At such a point, the tool will not be drawn in any further. As a result, the angled arrangement of the blade of knife 18 will simply cut transversely through the sheathing 50. After sufficient cutting has occurred, the flexible handle 13 of the tool 10 should be compressively grasped so that the projections on the channel 14 engage the sheathing 50. After the handle 13 has been squeezed, the tool 10 can be pulled outwardly from the tapered bore 56 of anchor 54 so that the sheathing 50 can be pulled from the cable 52. As can be seen in FIG. 13, this sheathing is separated from the steel wires which form the tendon. As the tool 10 is moved rearwardly, the sheathing 50 is separated from the underlying tendon.

Figure 14:
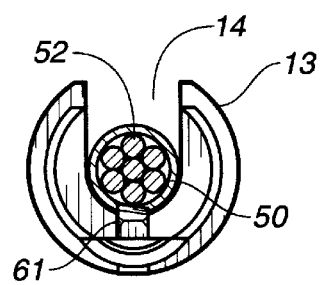
FIG. 14 is an end view showing the manner in which the tool of the present invention cuts through the sheathing of the cable.

FIG. 14 shows how the cutting blade 61 extends into and cuts through the sheathing 50 of cable 52. Additionally, FIG. 14 shows the manner in which the handle 13 can be squeezed so that the channel 14 engages the sheathing 50 of cable 52.

Figure 15:
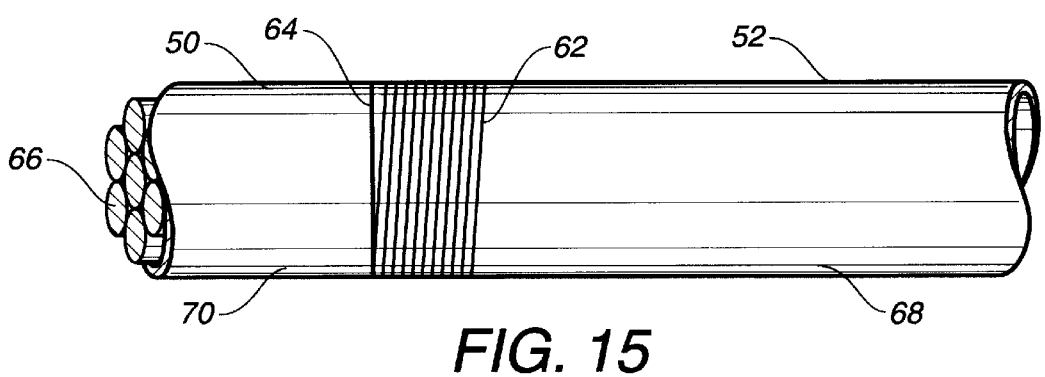
FIG. 15 is a diagrammatic illustration of how the tool of the present invention serves to draw the tool within the anchor body and to cut the sheathing from the cable.

In FIG. 15, it can be seen how the blade of knife 18 forms its incision into the sheathing 50 of cable 52. As can be seen, the rotation of the tool 10 creates a spiral pattern of incision 62 through the sheathing 50. When the tool 10 reaches its terminal portion within the tapered bore 56, the continued rotation of the tool 10 creates a transverse cut 64. The sheathing 50 can be separated from the steel wires 66 in the area of the cut 64. Portion 68 can be simply pulled away from the section 70 so as to separate the sheathing 50.

Unlike the prior art, the present invention requires no hammering. Since there is no "plowing" effect caused by the knife edge, there is no need to create a sharp machined steel carbide cutting edge. The knife can be simply affixed onto the end of the tool. There is no need for a pivoting arm of the type described in U.S. Pat. No. 5,632,088. The rotation of the tool 10 assures that the tool "bottoms out" within the tapered bore. As such, the problem of sheathing remaining in the area of the wedges is effectively avoided. The length of the tapered section will be identical to the length of the exposed tendon desired for use in conjunction with the wedges. The channel which opens to the exterior of the body of the tool allows the tool to be easily placed over the cable rather than threaded along the cable. The use of the polymeric material for the handle 13 can be formed by injection molding processes so as to provide a relatively inexpensive and more effective handle. The stamping of the knife, as used in the present invention, assures that a relatively inexpensive knife is provided.

The foregoing disclosure and description of the invention is illustrative and explanatory thereof. Various changes in the details of the illustrated apparatus or in the steps of the described method can be made within the scope of the appended claims without departing from the true spirit of the invention. The present invention should only be limited by the following claims and their legal equivalents.

I claim:

1. A device for stripping a cable comprising:
   a body having a channel extending therethrough, said body having a narrow end, said channel opening at said narrow end, said channel having a longitudinal axis, said body comprising a handle having said channel extending longitudinally therethrough, said channel defining a cable-receiving area in a cross-section transverse to said longitudinal axis, said handle being compressible so as to reduce a size of said cable-receiving area; and
   a knife affixed to said body so as to have a blade with a cutting edge extending upwardly into said channel, said blade extending at an angle of between 70 and 89 degrees with respect to said longitudinal axis.

2. The device of claim 1, said body further comprising:
   a cutting head affixed to an end of said handle, said channel extending through said handle and said cutting head, said knife affixed to said cutting head.

3. The device of claim 2, said handle having projections extending into said channel.

4. The device of claim 3, said projections being ribs extending parallel to said longitudinal axis of said channel.

5. The device of claim 2, said cutting head being removably affixed to said handle.

6. The device of claim 2, said cutting head having a notch extending along an outer surface of said cutting head, said knife being received within said notch.

7. The device of claim 6, said cutting head having a cutout area at said narrow end, said blade extending upward into said channel through said cutout area.

8. A device for stripping a cable comprising:
   a body having a channel extending therethrough, said body having a narrow end, said channel opening at said narrow end, said channel having a longitudinal axis; and
   a knife affixed to said body so as to have a blade with a cutting edge extending upwardly into said channel said blade extending at an angle of between 70 and 89 degrees with respect to said longitudinal axis, said body comprising:
   a handle,
   cutting head affixed to an end of said handle, said channel extending through said handle and said cutting head, said knife affixed to said cutting head, said cutting head having a notch extending along an outer surface of said cutting head, said knife received within said notch, and
   a locking member rotatably mounted onto said cutting head, said locking member movable between a first position locking said knife within said notch and a second position suitable for allowing removal of said knife from said notch.

9. The device of claim 8, said knife having a hole formed adjacent an end opposite said blade, said notch having a pin formed therein, said hole of said knife being received by said pin, said locking member abutting a surface of said knife in said first position such that said knife is retained by said pin.

10. The device of claim 1, said knife being formed of a stamped metal material.

11. The device of claim 1, said blade having a bottom surface, said cutting edge being inclined by approximately 15 degrees with respect to said bottom surface.

12. A device for stripping a cable comprising:
   a body having a channel extending therethrough, said body having a narrow end, said channel opening at said narrow end, said channel having a longitudinal axis, said body comprising:
  a handle formed of a compressible material so that a cross-sectional area of said channel transverse to said longitudinal axis is reducible upon application of a squeezing force onto said handle; and
  a cutting head affixed to an end of said handle, said channel extending through said handle and said cutting head; and
  a knife affixed to said body so as to have a blade with a cutting edge extending upwardly into said channel.

13. The device of claim 12, said handle having projections extending into said channel.

14. The device of claim 13, said projections being ribs extending parallel to said longitudinal axis of said channel.

15. The device of claim 12, said cutting head being removably affixed to said handle, said handle being formed of a polymeric material.

16. A device for stripping a cable comprising:
  a body having a channel extending therethrough, said body having a narrow end, said channel opening at said narrow end, said channel having a longitudinal axis, said body comprising:
    a handle; and
    a cutting head affixed to an end of said handle, said channel extending through said handle and said cutting head, said cutting head having a cutout area at said narrow end so as to extend inwardly of said channel from the narrow end; and
  a knife affixed to said cutting head and extending along a notch formed on an outer surface of said cutting head, said knife being fixedly received within said notch, said knife having a blade with a cutting edge extending upwardly into said channel through said cutout area, said blade extending at an angle not transverse to said longitudinal axis.

17. The device of claim 16, said body further comprising:
  a locking member rotatably mounted onto said cutting head, said locking member movable between a first position locking said knife within said notch and a second position suitable for releasing said knife from said notch.

18. The device of claim 17, said knife having a hole formed adjacent an end opposite said blade, said notch having a pin formed therein, said hole of said knife being received by said pin, said locking member abutting a surface of said knife in said first position.

19. The device of claim 16, said knife being formed of a stamped metal material.

20. The device of claim 16, said blade having a bottom surface, said cutting edge being inclined by approximately 15 degrees with respect to said bottom edge.

21. The device of claim 16, said blade extending at an angle of between 85 and 87 degrees with respect to said longitudinal axis.

22. The device of claim 16, said handle being compressible so as to reduce a cross-sectional area of said channel transverse to said longitudinal axis, said handle being formed of a polymeric material.

23. A method of stripping a sheathing from a cable in an anchor of a post-tension anchor system, the anchor having a tapered bore, the cable extending into the tapered bore, the method comprising:
  forming a tool having a channel extending therethrough with a knife affixed thereto and having a blade extending into said channel, said tool having a longitudinal axis, said blade being angularly offset to a transverse of said longitudinal axis;
  inserting said tool into the tapered bore of the anchor until said knife engages the sheathing of the cable;
  rotating the tool around the cable such that said knife draws said tool further into said tapered bore;
  squeezing said tool so as to compressively contact the sheathing exterior of said tapered bore; and
  pulling the tool from the tapered bore so as to remove a cut section of the sheathing from the tapered bore.

24. The method of claim 23, said step of forming comprising:
  forming a tapered section on said tool such that said tapered section narrows in diameter toward a narrow end, said tapered section having a diameter less than an inner diameter of said tapered bore.

25. The method of claim 24, said tapered section of said tool having an angle of taper generally matching an angle of taper of said tapered bore.

26. The method of claim 23, said step of forming comprising:
  forming said knife such that said blade is angularly offset between 1 and 20 degrees to the transverse of said longitudinal axis.

27. The method of claim 26, said blade being angularly offset by approximately 4 degrees to the transverse of the longitudinal axis.

28. The method of claim 23, said step of rotating comprising:
  rotating said tool until an outer surface of said tool abuts the tapered bore and cannot move further into the tapered bore.

29. The method of claim 23, said step of forming comprising:
  forming said tool so as to have a handle of a flexible polymeric material, said handle having projections extending into said channel.

* * * * *